United States Patent [19]

Smith et al.

[11] 4,249,699
[45] Feb. 10, 1981

[54] COAL RECOVERY PROCESSES UTILIZING AGGLOMERATION AND DENSITY DIFFERENTIAL SEPARATIONS

[75] Inventors: Clay D. Smith; Douglas V. Keller, Jr., both of Lafayette, N.Y.

[73] Assignee: Otisca Industries, Ltd., Syracuse, N.Y.

[21] Appl. No.: 100,091

[22] Filed: Dec. 4, 1979

Related U.S. Application Data

[63] Continuation-in-part of Ser. No. 91,129, Nov. 5, 1979, which is a continuation-in-part of Ser. No. 561,168, Mar. 24, 1975, Pat. No. 4,173,530, which is a continuation-in-part of Ser. No. 423,577, Jan. 14, 1974, abandoned.

[51] Int. Cl.³ .............................................. B02C 23/08
[52] U.S. Cl. ........................................ 241/20; 241/24; 209/5; 209/172
[58] Field of Search ........................................ 209/3–5, 209/9, 12, 172, 207, 49; 241/24, 16, 20; 44/1 SR

[56] References Cited

U.S. PATENT DOCUMENTS

| | | | |
|---|---|---|---|
| 994,950 | 6/1911 | DuPont | 209/172 |
| 2,150,899 | 3/1939 | Alexander et al. | 209/172 |
| 2,150,917 | 3/1939 | Foulke et al. | 209/172 |
| 2,151,578 | 3/1939 | Alexander et al. | 209/172 |
| 2,165,607 | 7/1939 | Blow | 209/172 |
| 2,208,758 | 7/1940 | Foulke et al. | 209/172 |
| 2,744,626 | 12/1952 | Reerink et al. | 209/49 |
| 2,769,537 | 11/1956 | Reerink et al. | 209/49 |
| 2,769,538 | 11/1956 | Reerink et al. | 209/49 |
| 2,781,904 | 2/1957 | Reerink et al. | 209/12 |
| 2,842,319 | 7/1958 | Reerink et al. | 241/14 |
| 2,859,917 | 11/1958 | Reerink et al. | 241/5 |
| 3,026,252 | 3/1962 | Muschenborn et al. | 202/31 |
| 3,027,306 | 3/1962 | Muschenborn et al. | 202/26 |
| 3,045,818 | 7/1962 | Muschenborn et al. | 209/49 |
| 3,098,035 | 7/1963 | Aplan | 209/5 |
| 3,261,559 | 7/1966 | Yavorsky et al. | 241/24 |
| 3,268,071 | 4/1966 | Puddington et al. | 209/5 |
| 3,348,675 | 10/1967 | Tveter | 209/5 |
| 3,471,267 | 10/1969 | Capes et al. | 23/313 |
| 3,637,464 | 1/1972 | Walsh et al. | 201/6 |
| 3,941,679 | 3/1976 | Smith et al. | 208/11 LE |
| 4,033,729 | 7/1977 | Capes et al. | 44/1 A |
| 4,076,505 | 2/1978 | Dessau | 44/1 R |

OTHER PUBLICATIONS

Brisse et al., Mining Engineering, Feb. 1958, pp. 258–261.
Sastry, K. V. S., Ed., Agglomeration 77, vol. 2, Am. Inst. of Mining, Met. & Pet. Engrs., Inc., NY, NY, 1977 (chs. 54–56, pp. 910–951).
Patching, S. W. F., "Developments in Heavy-Liquid Systems for Mineral Processing", Mine and Quarry Engineering, Apr. 1964, pp. 158–166.
Taggart, A. F., Handbook of Mineral Dressing, John Wiley & Sons, Inc., NY, NY, 1927, pp. 15-04 to 15-26 & 11-01 to 11-140.

Primary Examiner—Ralph J. Hill
Attorney, Agent, or Firm—LeBlanc, Nolan, Shur & Nies

[57] ABSTRACT

Processes for recovering coal from a particulate composite in which the composite is mechanically worked in the presence of an agglomeration promoting additive and in an aqueous carrier to effect a separation of the particles of coal in the composite from mineral matter associated therewith, a coalescence of the coal particles into product coal agglomerates, and a dispersion of the mineral matter in the aqueous carrier. The product coal agglomerates are resolved into their particulate constituents, and the latter are subjected to a density differential separation which effects a separation of that material in the agglomerates which has a relatively low mineral matter content and a high coal content from that having a higher content of mineral matter.

18 Claims, 1 Drawing Figure

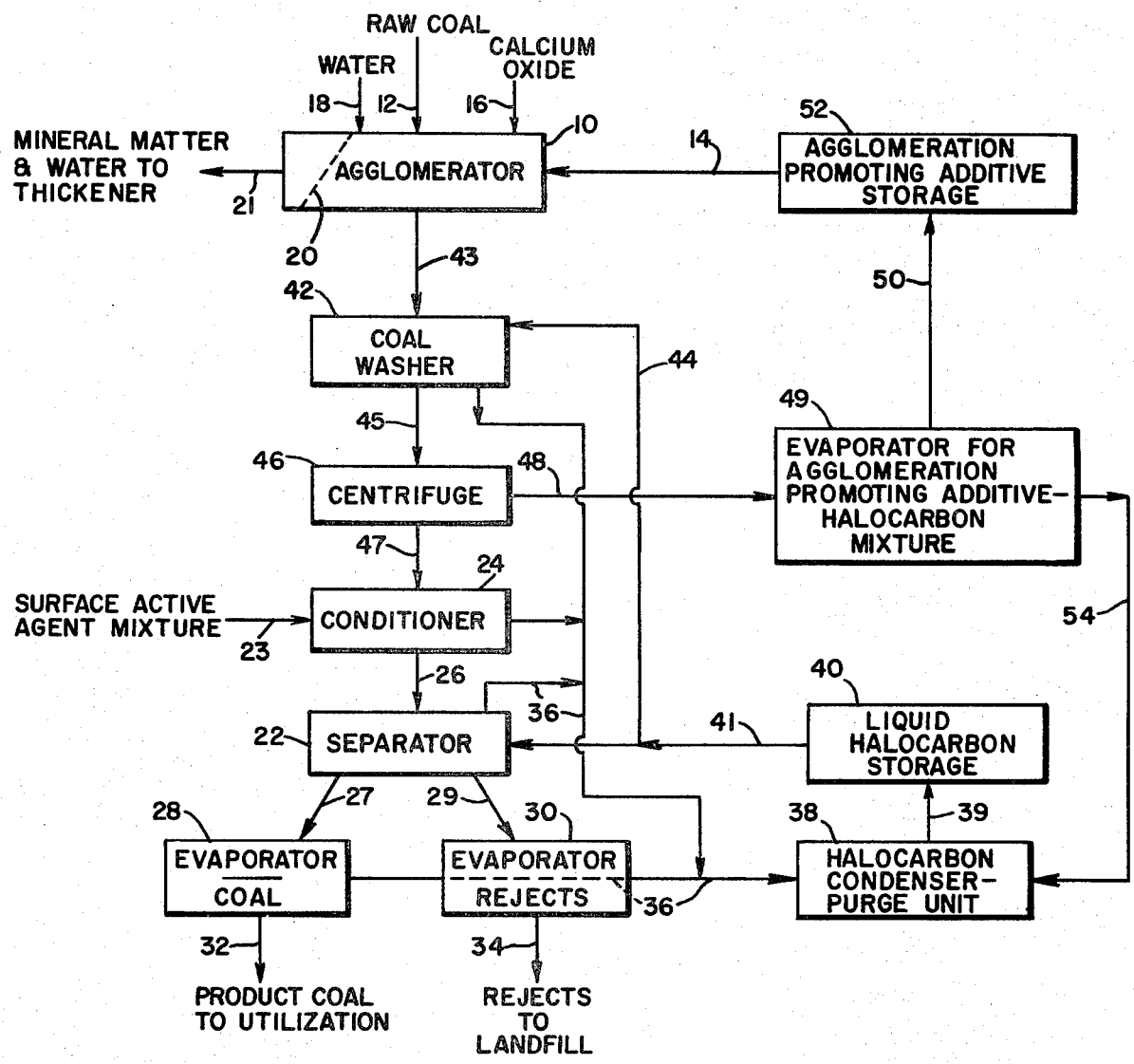

COAL RECOVERY PROCESSES UTILIZING AGGLOMERATION AND DENSITY DIFFERENTIAL SEPARATIONS

This application is a continuation-in-part of application Ser. No. 91,129 filed Nov. 5, 1979. The latter is a continuation-in-part of application Ser. No. 561,168 filed Mar. 24, 1975 (now U.S. Pat. No. 4,173,530, issued Nov. 6, 1979). Application Ser. No. 561,168 is a continuation-in-part of application Ser. No. 423,577 filed Jan. 14, 1974 (now abandoned).

The present invention relates to methods for separating particulate solids and, more particularly, to novel, improved methods for recovering coal from mixtures or composites in which the coal is associated with other solids by a combination of agglomeration and density differential separation techniques.

Certain terms used herein are defined as follows:

Raw coal—a composite of product coal and mineral matter which constitutes the feedstock for a process designed to remove at least part of the mineral matter therefrom. The raw coal may be as mined with or without having been subjected to preliminary preparation; or it may be the black water from a hydrobeneficiation plant or the culm from a sludge pond, etc.

Product (or "clean") coal—the carbonaceous coal phase generated in and recovered from a specified cleaning process and containing a lower percentage of impurities than the raw coal from which it is produced.

Mineral matter (or "refuse" or "gangue")—terms used herein for the sake of convenience to collectively identify the inorganic substances present in raw coal including rock, slate, shale, sulfur compounds, and water.

Ash—the non-combustibles present in raw and product coal. The ash may differ in content and composition from the mineral matter in the coal but is related thereto.

Floats—the lighter of two phases of solids generated by a density differential separation and composed primarily of product coal.

Sinks—the more dense of the two phases generated by a density differential separation and composed primarily of refuse.

Copending applications Ser. Nos. 933,845, filed Aug. 15, 1978 (now U.S. Pat. No. 4,186,887 dated Feb. 5, 1980), and 958,749, filed Nov. 8, 1978 (now abandoned), disclose processes for recovering coal in which raw coal is mechanically worked in aqueous slurry and in the presence of an agglomeration promoting additive (or "agglomerating agent") with respect to which the coal is hydrophobic to agglomerate the particles of coal and to eject water and mineral matter from the agglomerates into the aqueous phase of the slurry.

These agglomeration processes are capable of reducing the mineral matter contents of product coal to levels well below those which can be attained by employing state of the art processes.

We have now discovered that a product coal of even lower mineral content can be produced by subjecting product coal agglomerates generated in the manner described above to the differential density separation processes described in copending application Ser. No. 91,129, filed Nov. 5, 1979, and its parent application Ser. No. 561,168, filed Mar. 24, 1975.

In particular then, in our novel process for producing product coal with a low content of mineral matter, the raw coal, after having been comminuted to reduce its top size to an appropriate level, if necessary, is introduced into an agglomerator along with whatever water may be required to form a slurry of appropriate consistency and an agglomeration promoting additive with respect to which the particles of coal are hydrophobic.

The agglomerator mechanically forces the particles of coal in the slurry together in the presence of the additive to agglomerate the coal particles and to eject water and mineral matter from the agglomerates into the aqueous phase of the slurry. It can also be used in the circumstances described in copending application Ser. No. 933,845 to effect the milling necessary to effect the subsequent agglomeration of the coal particles.

This phase of our process produces product coal agglomerates which can readily be recovered by devices which are well-known to the prior art.

Because it is hydrophilic with respect to the aqueous carrier, the mineral matter remains dispersed in the latter. It can, therefore, also be easily recovered and handled. Typically, the mineral matter will be separated from the aqueous carrier with a device such as a Dorr thickener and the carrier then recycled to the agglomerator.

It is desirable, in many cases, to add calcium oxide to the slurry during the agglomeration process. For reasons which are not fully understood, the calcium oxide is effective in the presence of freshly exposed, unoxidized coal particle surfaces to cause pyritic materials to remain dispersed in the aqueous phase of the slurry without adversely affecting the coalescence of the product coal. That is, the calcium oxide apparently inhibits the ability of the pyritic material to agglomerate along with product coal without affecting the agglomeration of the latter.

Pyritic sulfur contents of only a fraction of one percent have consistently been obtained by employing the technique just described.

Also, in the course of agglomeration, the calcium oxide is associated with the product coal in a manner which increases the hydrogasification and steam gasification reactivities of the coal, another benefit of decided economic importance.

Furthermore, when coal fortified with calcium oxide in the manner just described is burned, the calcium ions react with sulfur remaining in the coal, forming a precipitate that can be readily removed from the combustion products. Thus, the presence of calcium ions in the coal produced by our novel process actually facilitates the removal of pollutants from the combustion products.

Depending upon the nature of the agglomeration promoting additive, the product coal agglomerates are either (a) transferred directly to a density differential separator (or separation conditioner); or (b) first washed with a solvent to strip away and thereby recover the agglomeration promoting additive and then transferred to the conditioner or separator.

If the last-mentioned approach is employed, the solvent agglomeration promoting additive is, in one option, recovered from the solids by a solvent wash before the latter are subjected to density differential separation and recycled.

In the separator the product coal agglomerates from the agglomerator (or the particulate material into which the agglomerates are resolved by the solvent wash) are introduced into a body of heavy liquid which is a halogenated hydrocarbon and which has a specific gravity between that of the coal being cleaned and the mineral matter associated therewith. A liquid which has the foregoing characteristics and is furthermore a solvent for the agglomerating agent used in the earlier beneficiation step is selected if the above-discussed solvent wash is not employed.

In the circumstance just described, the process liquid dissolves or otherwise dissociates therefrom the agglomerating agent associated with the agglomerates fed to the separator. The material making up the agglomerates, whether then or previously liberated, disperses in the body of process liquid. And, by virtue of archimedes' principle, the lower mineral content product coal particles rise to the top of the process liquid as they have the lower specific gravities; and the unwanted, higher mineral content particles sink to the bottom of the body of liquid as they do in a conventional gravity separation process. The resulting floats and sinks are recovered separately from the process liquid and transferred to appropriate evaporators or other devices to thermally and/or mechanically recover the parting liquid, which is condensed and recycled.

As suggested above by the reference to a conditioner, we condition the agglomerates or their liberated constituents prior to introducing them into the gravity separation bath. In this step, we contact the solids with a halogenated hydrocarbon and a cationic or anionic surface active agent.

Conditioning as just described causes surface water carried over to the separator from the agglomerator, and which would be expected to remain with the floats because of its lower specific gravity relative to the separation liquid, to instead report to the sinks. Conditioning may accordingly make it unnecessary to subsequently dewater the floats.

Reducing the need for dewatering the floats generates corresponding savings in capital investment for equipment, in operating costs, and in expenditures of energy.

Also, as discussed in detail in application No. 91,129, conditioning with a surface active agent of the character just described and with a halogenated hydrocarbon can completely change the nature of the density differential separation step in a manner which increases the efficiency of the separation step by agglomerating the particles dominated by mineral matter as the solids move through the conditioner and by enveloping the predominantly coal particles with the surface active agent. The agglomeration of the mineral matter at least materially reduces the content of dispersed mineral matter in the bath of separation liquid, facilitating the migration of the product coal particles (especially the fines) toward the top of the bath by eliminating the interference to such migration caused by particulate mineral matter in conventional gravity separation processes.

The envelopment of the coal particles with the surface active agent keeps those particles from agglomerating with particles of mineral matter as they do to a significant extent in conventional heavy liquid gravity separation processes. Agglomeration of the just described character is undesirable because it results in coal reporting to the bottom of the heavy liquid bath with the mineral matter and being lost and in unwanted mineral matter reporting to the top of the bath with the product coal.

There is also good evidence that the presence of the surface active agent on the product coal particles reduces the adverse effect of particle concentration on the viscosity of the bath and that this phenomenon is independent of the mineral matter agglomeration effect discussed above.

A plethora of gravity separation processes for cleaning coal have heretofore been proposed as evidenced by U.S. Pat. Nos. 994,950 issued June 13, 1911, to DuPont; 2,150,899 issued Mar. 21, 1939, to Alexander et al; 2,150,917 issued Mar. 21, 1939, to Foulke et al; 2,208,758 issued July 23, 1940, to Foulke et al; 3,026,252 issued Mar. 20, 1962, to Muschenborn et al; 3,027,306 issued Mar. 27, 1962, to Muschenborn et al; 3,098,035 issued July 16, 1963, to Aplan; 3,261,559 issued July 19, 1966, to Yavorsky et al; 3,348,675 issued Oct. 24, 1967, to Tveter; and 4,076,505 issued Feb. 26, 1978, to Dessau; and gravity separation cleaning of coal using a moving aqueous slurry of magnetite as the parting liquid is in widespread commercial use today.

Similarly, numerous agglomeration type coal cleaning processes have heretofore been proposed—see *Agglomeration 77*, Volume 2, K.V.S. Sastry, Ed., American Institute of Mining, Metallurgical & Petroleum Engineers, Inc., New York, New York, 1977, chapters 54–56, pages 910–951; "Convertol Process", Brisse et al, *Mining Engineering*, February 1958, pages 258–261; and U.S. Pat. Nos. 2,744,626 issued May 8, 1956, to Reerink et al; 2,769,537 issued Nov. 6, 1956, to Reerink et al; 2,769,538 issued Nov. 6, 1956, to Reerink et al; 2,781,904 issued Feb. 19, 1957, to Reerink et al; 2,842,319 issued July 8, 1958, to Reerink et al; 2,859,917 issued Nov. 11, 1958, to Reerink et al; 3,045,818 issued July 24, 1962, to Muschenborn et al; 3,268,071 issued Apr. 23, 1966, to Puddington et al; 3,637,464 issued Jan. 25, 1972, to Walsh et al; and 4,033,729 issued July 5, 1977, to Capes et al.

There is, however, nothing in any of the foregoing references or in any other prior art known to us which suggests that, as we have discovered, agglomeration and density differential type separation processes can be combined to produce a superior product coal in terms of reduced mineral content. Or, in other words, there is nothing in the above-cited prior art which suggests that, as we have discovered, the product coal generated in an agglomeration process can be significantly upgraded in quality by subjecting it to density differential separation as described above.

A fortiori, there is nothing in the prior art which would suggest that, as previously discussed, a potential for an even more efficient reduction in ash content of the product coal can be obtained by conditioning the agglomerates with a heavy liquid of the character employed in the density differential step and a surface active agent before carrying out the subsequent differential density separation step.

Furthermore, as pointed out in pending application No. 933,845, the product coal from an agglomeration type separation process may contain appreciable amounts of water (10–15 weight percent or higher). "Developments In Heavy-Liquid Systems for Mineral Processing", Patching, *Mine and Quarry Engineering*, April 1964, pp. 158–166 and Tveter U.S. Pat. No. 3,348,675 indicate that, under such circumstances, heavy liquid gravity separation processes would be of little utility if not totally inoperative. In contrast, as indicated above, we have found that, when carried out in accord with the principles of the present invention, density differential separation is highly efficacious even if the agglomerates or agglomerate constituents fed to the density differential separator have a high moisture content.

The agglomeration type separation processes disclosed in the above-cited references also, importantly, differ from those we employ in that a significant amount, if not all, of the agglomeration promoting additive is left on the product coal agglomerates. This is economically disadvantageous; and, further, the agglomeration promoting additive may be a chemical contaminant.

This is an important disadvantage because contaminated coals are undesirable. In the case of steaming coals chemical contaminants can cause boiler corrosion. Contaminated coking coals can alter the chemistry of the reactions in which they are employed in unwanted directions.

We can overcome the just discussed disadvantage of heretofore proposed agglomeration type processes by employing as agglomeration promoting additives certain fluorocarbon compounds and compositions which have the advantages that they remain liquids in a useful temperature range but can be evaporated at relatively low temperatures and that they possess low latent heats of vaporization, viscosities and surface tensions and do not react chemically with coal under the conditions in which we employ them. They are, furthermore, non-flammable, odor free, non-corrosive, and non-toxic. These are also important attributes for obvious reasons.

We can also employ traditional agglomeration promoting additives as disclosed in the cited references in the agglomeration separation phase of our novel process because we have discovered a novel technique which makes it possible to recover such additives from product coal agglomerates in amounts approaching quantitative at commercially visible costs.

In general, this is accomplished by extracting or stripping the agglomeration promoting additive from the agglomerates with an appropriate solvent. The solvents we employ are halogenated hydrocarbons (halocarbons) of the same composition as those we utilize in the subsequent density differential separation step of our process.

The use of surface active agents in gravity separation processes using halogenated hydrocarbon heavy liquids has also heretofore been proposed (see Tveter, Aplan, and Foulke et al U.S. Pat. No. 2,208,758 and U.S. Pat. No. 2,165,607 issued July 11, 1939, to Blow).

Blow, however, is not concerned with the cleaning of coal; and there is nothing in his patent which would leave one to believe that surface active agents could be used to advantage in coal beneficiation processes. Furthermore, Blow does not use surface active agents in a manner which—as is an important feature of our invention—effects an agglomeration of unwanted mineral matter or gangue. In his process such agents are used only to displace the process liquid from the particles of wanted and unwanted materials after they have been separated.

Foulke et al chose surface active agents which would fix a water film on the product coal being recovered rather than freeing it from that material for removal to the sinks and the formation of agglomerates. This is completely different from the use we make of surface active agents in the process described herein.

The process liquids which Aplan uses in the beneficiation of coal are aqueous suspensions of solid particles. The patent teaches nothing concerning the use of surface active agents in conjunction with halogenated hydrocarbon heavy liquid type media except for implying that this can be done.

Our use of surface active agents in coal beneficiation is also readily distinguishable from Tveter's. Tveter ties the amount of surface active agents he employs to the amount of process liquid being employed, not to the amount of coal being conditioned as is necessary in our process.

Also, the Tveter process requires that the coal being treated have (or be dried to) a maximum moisture content of two weight percent. Our process, in contrast, requires that this much moisture be present as a minimum in the conditioning step; and it is equally useful in beneficiating coals having much higher moisture contents.

Another feature which radically distinguishes our process from those just discussed prior art coal beneficiation processes employing surface active agents is that the coal being beneficiated is conditioned with a halogenated hydrocarbon as well as the surface active agent. This leads to the much different results discussed above.

Also, in those processes disclosed in the foregoing patents, the surface active agent is not employed in a conditioning step as it is in our process. It is instead added to the parting liquid in a gravity separator. Our technique has the advantage that amount, exposure, and time factors can be optimized independent of the separation stage in addition to keeping the mineral matter from dispersing in the coal collection bath and inhibiting the migration of particles through that bath.

From the foregoing it will be apparent to the reader that the primary object of the present invention is the provision of novel, improved processes for recovering coal from mixtures or composites in which the coal is associated with mineral matter.

Other perhaps equally important but more specific objects of the invention reside in the provision of processes in accord with the preceding object:

which are capable of generating product coal having a lower content of mineral solids than it has heretofore been practical, if possible at all, to produce by using a conventional gravity separation process or by using an agglomeration type coal cleaning process;

which are capable of generating a product coal having an extremely low pyritic sulfur content;

which permit additives and other agents employed in the process to be recovered in amounts approaching quantitative and with only modest expenditures of energy;

which can be carried out under ambient conditions or conditions approaching ambient.

Yet another important object of our invention resides in the provision of novel, improved processes in accord with the primary object in which raw coal is subjected to agglomeration separation to separate the coal particles thereof from associated mineral matter and to coalesce the particles into agglomerates and in which the agglomerates are resolved into their constituents and the latter subjected to density differential separation to separate those particles with lower mineral solids contents from those of higher mineral contents, thereby upgrading the quality of the product coal.

Still other important objects, features, and advantages of our invention will be apparent to the reader from the foregoing, from the appended claims, and from the ensuing description and discussion taken in conjunction with the accompanying drawing.

In the drawing, the single FIGURE is a flow diagram of a process embodying the principles of the present invention for recovering coal from a composite in which it is associated with unwanted mineral matter.

Referring now to the drawing, the first phase of our novel process involves the steps of separating particles of coal from mineral matter associated therewith and subsequently agglomerating the coal particles.

This phase of the process is carried out in an agglomerator 10 which may be, for example: a ball, beater, buhr, cage, Chilean, colloid, disc, disintegrating, hammer, pebble, pendelum, pin, Raymond, or rod mill.

Other types of agglomerators—for example, those described in Reerink et al U.S. Pat. No. 2,744,626 and in U.S. Pat. No. 3,471,267 issued Oct. 7, 1969, to Capes et al—can be employed instead if comminution of the raw coal beyond what they are capable of effecting is not needed or is to be dispensed with for some other reason.

The foregoing steps can be carried out at ambient temperature and pressure.

The agglomerator provides mechanical forces which jam the coal particles into agglomerates of the wanted character and which eject the mineral matter and water from the agglomerates. In addition, the agglomerator may be employed to knead or work the agglomerates in order to expel additional mineral matter and water therefrom.

A mill type agglomerator also reduces the size of the material fed to it, thereby typically furthering the liberation of product coal from the mineral matter to which it is bound and, in addition, exposing fresh surfaces on the coal particles.

This can be advantageous because the agglomeration of the product coal particles may involve surface active phenomena which, generally, operate most efficiently only on freshly exposed coal particle surfaces.

In the exemplary embodiment of our invention carried out as shown in the drawing, raw coal (i.e., the coal to be cleaned), an agglomeration promoting additive, and hydrated or anhydrous calcium oxide (optional) are introduced into the mill through transfer devices identified generally by reference characters 12, 14, and 16. Such water as may be necessary to form a slurry with appropriate characteristics is introduced into agglomerator 10 through conduit 18.

We may employ certain methane and ethane based ($C_1$ and $C_2$) fluorocarbons as the agglomeration promoting additives. Those fluorocarbons we consider suitable because coal is hydrophobic with respect to them, because they do not chemically react with coal under the process conditions we employ, and because of their boiling points (ca. 40°–156° F.) and other desirable physical characteristics (low viscosity, latent heat of vaporization, and surface tension, and lack of tendency to form azeotropes) are:

1-Chloro-2,2,2-trifluoroethane
1,1-Dichloro-2,2,2-trifluoroethane
Dichlorofluoromethane
1-Chloro-2-fluoroethane
1,1,2-Trichloro-1,2,2-trifluoroethane
1,1-Dichloro-1,2,2,2-tetrafluoroethane
Trichlorofluoromethane Mixtures of the foregoing fluorocarbons can also be employed.

Of the listed fluorocarbons, all but the last three are at the present time probably too expensive to be practical from an economic viewpoint. And, of the latter, 1,2,2-trichloro-1,2,2-trifluoroethane and trichlorofluoromethane are preferred because of their optimum physical properties, lack of chemical activity, and relatively low cost.

Conventional and other agglomeration promoting additives can, alternatively, be employed in our novel process. Usable conventional agglomerating agents include petroleum distillates; nitrobenzenes; petroleum solvents such as those of the Varsol type; kerosene; lubricating, fuel, and residual oils; halocarbons such as carbon tetrachloride or chlorinated biphenyls; liquid hydrocarbons such as pentane; and mixtures of the foregoing.

The minimum amount of additive we employ is that necessary for an efficient agglomeration of the particles of product coal to be effected. Three to six percent by volume of the additive based on the volume of the liquid carrier-raw coal-additive system serves the purpose if a fluorocarbon additive is employed. In the case of a conventional additive from 6–25 weight percent of agglomeration promoting additive is used based on the solids content of the water slurry.

The ratio of additive to coal is maintained in the range of 0.1 to 0.5 by volume if the fluorocarbon type additive is used with a ratio of around 0.3 being preferred. At lower ratios the amount of additive may not be sufficient to affect the wanted, complete agglomeration of the product coal; at ratios higher than that specified, efficient rejection of the particles of mineral matter may not be effected because the excess additive may form a film through which substantial amounts of the particles may not have sufficient energy to escape.

A minimum of fifty percent of water based on the volume of the raw coal-additive-liquid system is maintained in agglomerator 10. Lower amounts do not provide a sufficiently large body of liquid to keep the mineral matter suspended in the aqueous carrier. Often, the water associated with the raw coal will itself meet this minimum requirement in which case it may not be necessary to introduce additional water.

The maximum amount of water and agglomeration promoting additive that can be tolerated in agglomerator 10 depends upon the type of equipment that is employed. In the case of a mill the maximum allowable concentration is that at which the comminution of the solids in the mill becomes inefficient. Depending upon the type of mill being employed, up to 95 percent of water and additive combined may be employed based upon the volume of the raw coal.

For the reasons pointed out above, it may prove advantageous to add calcium oxide to agglomerator 10 along with the raw coal and agglomeration promoting additive. From 0.5 to 3 percent of calcium oxide (calculated as CaO) based on the weight of the raw coal is employed. If less calcium oxide is used it will not produce the wanted results to any significant extent. Amounts of calcium oxide above the stated limit may cause product coal to remain dispersed in the aqueous phase of the slurry in agglomerator 10 to an extent that would result in a significant BTU loss.

Either anhydrous or hydrated calcium oxide can be used.

It is preferred that the calcium oxide be dosed or metered to the slurry over the period of residence in agglomerator 10. That method of adding the oxide results in a substantially higher separation of pyrite from the product coal than can be obtained by a batch-type addition of the calcium oxide to the slurry.

The residence time of the coal in agglomerator 10 is that necessary to separate the raw coal into particles of product coal and other mineral matter and to effect a subsequent agglomeration of the coal particles. In a ball mill this will typically require two hours for a representative coal.

We pointed out above that optimum results can, in some cases, be obtained by also comminuting the raw coal in the agglomerator. Residence times of the magnitude discussed above in a ball mill will effect an adequate generation of fresh surfaces.

If grinding or comminution is employed, the proportion of ultrafine particles in the raw coal feedstock should be limited to ensure that there is an adequate number of freshly exposed coal particle surfaces. This dictates that the raw coal supplied to agglomerator 10 have a minimum top size on the order of about 60 m (mesh Tyler)×0 (0.25 mm×0).

We prefer that the water or aqueous portion of the slurry be changed after grinding periods of a few minutes or that a discharge of refuse laden water and concomitant replacement of that phase with fresh water be effected in accord with conventional milling practice as this will ensure that an optimum separation of mineral solids from coal particles is obtained. If the latter approach is employed, a supply and discharge rate of approximately 100–120% per hour based on the volume of the aqueous carrier will typically be employed where optimum separation of mineral matter is wanted.

The aqueous carrier, agglomerates, and mineral matter are discharged from agglomerator 10 through a screen 20 as shown in the drawing or through a sieve bend or other separation device to separate the agglomerates from the aqueous phase in which the unwanted mineral matter is dispersed. The aqueous phase is transferred through line 21 to a conventional thickener (not shown). Several types of suitable thickeners are described in Taggart, *Handbook of Mineral Dressing*, John Wiley & Sons, Inc., New York, N.Y., 1927, pp. 15-04-15-26, hereby incorporated herein by reference. In the thickener the mineral matter is separated from the water. The water may be recycled, and the mineral matter may be transferred to a refuse heap.

The step of our novel process following the agglomeration phase just discussed depends in large part on the nature of the agglomeration promoting additive utilized in that phase. If a fluorocarbon type additive is employed the product coal agglomerates retained on screen 20 or otherwise separated from the aqueous phase may be dried as by expressing them through steel rolls as described hereinafter and then transferred directly to the schematically illustrated density differential separation unit 22 in those cases when the additive is compatible with, if not the same as, the process liquid in the latter. This makes it unnecessary to separate the additive from the product coal agglomerates before proceeding with the density differential separation step.

As discussed above, we employ density differential gravity separation to resolve the product coal in the agglomerates into two phases, one composed of coal particles having relatively low contents of mineral matter (product coal) and the other composed of particles having higher contents of such material (refuse). We also pointed out that this is accomplished by introducing the agglomerates into a body of a parting liquid or parting liquid-solvent which has a specific gravity between those of the particles making up the foregoing phases and which also has the capacity of dissolving the agglomeration promoting additive or otherwise liberating the particles making up the agglomerates for subsequent resolution of those particles into low mineral content floats and high mineral content sinks in applications of our invention in which such dissolution is not accomplished in an earlier step.

We employ as process liquids in the differential density separator for the foregoing purposes halogenated hydrocarbons which are immiscible with water and which have one or two carbon atoms ($C_1$ and $C_2$ hydrocarbons), two to six halogen atoms, and a specific gravity in the range of 1.2 to 2.2. Halogenated hydrocarbons with specific gravities above 2.2 are of no value for our purposes because so much mineral matter will report to the top of the separation liquid bath with the coal that the resulting product will have no commercial value. In fact, for this same reason, halogenated hydrocarbons having a specific gravity above 1.7 are, generally speaking, of little commercial value for our purposes.

Representative of those compounds we can employ are:

Ethylene Dibromide
Bromotrichloromethane
Bromochloromethane
Pentachloroethane
Tetrachloroethylene
Trichloroethylene
1,1,1-Trichloroethane
Ethylene Dichloride
Perchloroethylene
Carbon Tetrachloride
Methyl Chloroform
Trichlorobromomethane
1,2-Dibromoethane
Fluorobromomethane
1-Chloro-2-bromoethane
1-Chloro-1-bromoethane
Methylene Bromide
Dibromochloromethane
Tribromofluoromethane
Bromodichloromethane
1,2-Dibromo-1,1,2-trichloroethane
1,2-Dibromotetrafluoroethane
1,1,1-Chlorodibromoethane
1,1-Dibromoethane
Chlorodibromomethane
1,1-Chloroiodoethane
1-Chloro-2-iodoethane
1-Fluoro-1,1-dichloro-1,2-dibromoethane
Fluorochlorobromomethane
1,1,1-Trichloro-2,2-dichlorfluoroethane
1,1,1-Trichloro-2-chloro-2-fluoroethane
1-Chloro-2,2,2-trifluoroethane
1,1-Dichloro-2,2,2-trifluoroethane
Dichlorofluoromethane
1-Chloro-2-fluoroethane
1,1,2-Trichloro-1,2,2-trifluoroethane
1,1-Dichloro-1,2,2,2-tetrafluoroethane
Trichlorofluoromethane Tveter and Alexander U.S. Pat. No. 2,151,578 disclose a number of additional halogenated hydrocarbons which are purportedly useful in beneficiating coal. Those of the disclosed compounds which meet the criteria discussed above are among the many other halogenated hydrocarbons that can be used for our purposes.

Mixtures of two or more of the foregoing and other halogenated hydrocarbons can also be employed as long as the halogenated hydrocarbons are miscible and the mixture meets the criteria specified above.

Also, diluents can be added to the halogenated hydrocarbon or mixtures thereof to adjust the specific gravity of the liquid in the density differential separator in order to effect an optimal resolution of the agglomerates into the wanted phases.

This adjustment can also be accomplished by varying the temperature of and/or the pressure on the parting liquid.

For example, the nominal 1.5 specific gravity of trichlorofluoromethane can be varied within a range of approximately 1.55–1.4 by modest variations of the temperature and/or pressure in the density differential separator.

Lower specific gravities can be obtained by mixing a diluent such as a light petroleum fraction with the parting liquid. The same technique can also be employed to maintain the specific gravity of the parting liquid constant or to vary it in a controlled manner under changing ambient conditions.

Also, petroleum ether (a mixture of pentane and hexane) can be employed to reduce the specific gravity of the parting liquid to as low as 1.3 at ambient temperature and pressure. Other liquids can be employed instead. Pentane, for example, has the properties which makes it useful for this purpose—a low boiling point and a low heat of vaporization.

Appropriate hardware for adjusting the specific gravity of the parting liquid by all of the techniques described above is disclosed in our application Ser. No. 561,168.

As indicated above, we prefer to condition the product coal agglomerates or their constituents with a halogenated hydrocarbon and a surface active agent prior to introducing them into the density differential separation bath. This step is perhaps not theoretically necessary, but its deletion tends to make the subsequent differential separation so inefficient that the process becomes commercially impractical.

To obtain the wanted agglomeration of the particulate mineral matter, the raw coal being conditioned must have a moisture content of at least two percent in available form. Typically, this will be essentially surface moisture although a small part of the inherent moisture of the coal can be relied upon to make up the required minimum; and water can be added, if necessary, for this purpose.

The presence of water in the separation process does not pose the problem that it does in other coal beneficiation processes because, as discussed above, the water reports to the bottom of the density differential separation bath with the mineral matter in the step in which the product coal is collected. This remains true even though the moisture content of the coal being cleaned may range as high as 10 to 20 percent.

The maximum amount of moisture that can be tolerated without adversely affecting the beneficiation process disclosed herein will vary from application-to-application of our invention but can be readily determined as it is a function of the composite apparent density (CAD) of the mineral matter composites in which the water appears. If too much water is present, the mineral matter-water composites formed by the transfer of surface moisture may have a CAD which is near, or even lower than, the density of the halogenated hydrocarbon employed in the coal collection step of the process.

In the just related circumstances, two adverse effects may result. The migration of the composites to the bottom of the halogenated hydrocarbon bath may be slowed to the point that the beneficiation process becomes impractical, and significant amounts of the composites may migrate toward the top of the bath with the coal particles leaving the ash content of the product at an impractically high level.

The heavy halogenated hydrocarbons useful in conditioning coal in accord with the principles of the present invention are those employed in the subsequent separation of product coal from the mineral matter associated therewith and identified above.

The concentration of the surface active agent is also important in the practice of our invention. From 0.01 to 2 pounds per ton of raw coal can be employed.

In any event sufficient surface active agent must be employed to establish a monolayer film on all of the coal particles present in the conditioner, and a small overage is preferably provided. This excess accommodates losses attributable to water-halogenated hydrocarbon distribution functions and to cation-induced precipitation of the surface active agent in the aqueous phase of the raw coal slurry in the conditioner.

Excessive amounts of surface active agent can result in the water present in the conditioner being dispersed as a micellular phase composed of water-ash envelopes less than 1 $\mu$m in diameter in the bath of coal collecting halogenated hydrocarbon liquid. This leads through a build-up of middlings to an increase in the viscosity of the bath and the appurtenant problems discussed above. Also, the reduction of viscosity can lead to further middling build-up with the cycle continuing to the point where the loss in efficiency can make the beneficiation process impractical.

Lower concentrations of surface active agent do not furnish enough of that constituent to ensure that all of the coal particles will be enveloped or covered with a film of the surface active agent. To the extent that this does not occur, density differential separation will not proceed in the intended manner; and the advantages of the present invention will not be obtained.

Furthermore, the use of excessive surface active agent is economically disadvantageous, a factor of substantial importance because of the relatively high cost of appropriate compositions.

Among the surface active agents we have successfully employed are the following:

TABLE 1

| Surface Active Agent | Type | Composition | Manufacturer |
|---|---|---|---|
| Aerosol OT-100 | Anionic | Dioctyl ester of sulfosuccinic acid | American Cyanamid |
| Aerosol OT-75 | Anionic | Dioctyl ester of sulfosuccinic acid | American Cyanamid |
| Cal Supreme Perk-Sheen | Cationic | Dioctyl ester of sulfosuccinic acid | Penwalt-Caled Company Adco, Inc. |
| Super-Cal | Anionic | Dodecyl benzene sulfonic acid salt | Penwalt-Caled Company |
| Pace-Perk | Anionic | Dodecyl benzene sulfonic acid salt | Penwalt-Caled Company |

TABLE 1-continued

| Surface Active Agent | Type | Composition | Manufacturer |
|---|---|---|---|
| Strodex Super V-8 | Anionic | Complex organic phosphate esters | Dexter Corporation |
| Strodex P-100 | Anionic | Complex polyphosphate ester acid anhydride | Dexter Corporation |
| Witconate P10-59 | Anionic | Amine salt of dodecylbenzene sulfonic acid | Witco Chemical Corporation |
| Witcomine | Cationic | 1-Polyaminoethyl-2n-alkyl-2-imidazoline | Witco Chemical Corporation |
| Triton GR-7M | Anionic | Dioctyl sodium sulfonate plus solvent | Rohm and Haas |
| OTS | Anionic | Seventy percent solution of dioctv sulfo sodium succinate in mineral spirits | American Cyanamid |

Typically, the surface active agents we employ are solids at room temperature. However, suitable surface active agents are soluble in water and/or the heavy halogenated hydrocarbons we employ; and they can be employed by dissolving them in a solvent of the foregoing character.

Typically, the organic type solvent will be employed. Agitation of the raw coal with the halogenated hydrocarbon appears to be essential to cause moisture to transfer to the particles of mineral matter and effect the wanted agglomeration of those particles. As a halogenated hydrocarbon will consequently be supplied to the conditioner in any event, use of that constituent makes it unnecessary to use yet another substance as the surfactant carrier.

Other parameters of signal importance in the practice of our invention are the weight percent of raw coal in the conditioner slurry and the residence time of the raw coal in the conditioner (i.e., the period for which the coal is agitated in the presence of the surface active agent and the halogenated hydrocarbon).

Slurries containing 50 to 80 percent by weight of solids are suitable.

Higher solids concentrations may result in incomplete conditioning and, more particularly, in a failure to completely wet all of the coal particles with the solution of the surface active agent. Solids concentrations below the specified minimum can result in a long range diffusion of the molecules of surface active agents which has the same adverse result.

In general, solids concentrations should be related to the size distribution of the raw coal particles. For example, as the top size of the raw coal increases, the time required for conditioning the coal in a dilute slurry decreases. The requisite residence time for complete conditioning may not be available in such cases as a practical matter; and the concentration of raw coal in the slurry should accordingly be increased to ensure that complete conditioning and the maximum removal of mineral matter that results are obtained.

In typical applications of our invention, the problems discussed above can be avoided by employing a solids concentration on the order of 60 weight percent.

We employ residence times in the range of 0.2 to 5 minutes. Shorter times are not sufficient to complete the wanted agglomeration of the particulate mineral matter, and longer residence times are economically impractical. Typically, a residence time on the order of 30 to 60 seconds will be employed as the wanted conditioning will have been completed by then to an extent which makes further residence time impractical from the economic viewpoint. The particular time employed will depend primarily on the surface active agent used; and the residence time for a particular composition can be readily optimized by actual test, if necessary.

The type of pattern of agitation employed in the conditioner can be varied as desired. High speed, egg beater, propeller, spoon type, screw, and wrist action agitations have all been employed with no significant variation in results as measured in terms of yield and ash content of the product coal.

Referring again to the drawing, the halogenated hydrocarbon conditioning liquid is premixed with the surface active agent in those applications of our invention employing conditioning to ensure subsequent homogeneous distribution of the latter and the complete wetting of the product coal particles.

The mixture of halogenated hydrocarbon and surface active agent then flows through line 23 to conditioning tank 24 where the liquid phase and raw coal are formed into a slurry and agitated. This results in a transfer of water from the product coal to the mineral matter associated therewith, a coalescence of the mineral matter particles into relatively massive agglomerates, and the surrounding of the product coal particles with films of surface active agent.

The mixture thus formed in conditioner 24 is transferred by an appropriate conveyor, indicated by arrow 26, to separator 22 where the resolution of the condition feedstock into floats and sinks proceeds apace.

Separator 22 may be any of the various types of devices employing the density differential separation principle. The separator may in this respect be either of the stationary media (static) type shown in the drawing or of the flowing media (dynamic) type. An example of the latter is the centrifugal separator disclosed in U.S. Pat. No. 2,190,234 issued Feb. 23, 1938, to Keenan. Other suitable density differential separators, including several of the flowing media type, are described in Taggart, *Handbook of Mineral Dressing*, John Wiley & Sons, Inc., New York, N.Y., 1927, Chapter 11, pp. 1-140.

The floats are skimmed from the surface of the parting liquid and discharged into the lower, feed end of an upwardly inclined conveyor (indicated generally by arrow 27) which transfers the floats to evaporator 28. As the product coal moves upwardly through the conveyor, the bulk of the parting liquid drains from it and flows by gravity into separator 22.

Refuse is removed from the bottom of separator 22 and discharged into the lower, feed end of a second, upwardly inclined, transfer conveyor illustrated schematically as arrow 29. Parting liquid removed from separator 22 with the refuse drains back into the separator, and the rejects are discharged into evaporator 30.

Evaporators 28 and 30 will typically be of the indirect, conductive type. Examples of such evaporators which are suitable are the rotary, steam tube, and Holo-Flite types.

The dry floats and rejects are discharged from evaporators 28 and 30 to material handling systems indicated generally by arrows 32 and 34 in the drawing. The rejects are typically transferred to a gob pile or landfill and the clean floats to the point-of-use or to a coking or other coal treating operation.

Vaporized process liquid generated in evaporators 28 and 30 is combined with that from conditioner 24 and separator 22 in a vapor recovery system 36 leading to a condensor-purge unit 38. Condensed, degassed parting liquid is pumped from unit 38 through line 39 to a parting liquid storage facility or tank 40.

The process liquid is transferred from facility 40 to gravity separator 22 through line 41 to replace parting liquid discharged from the latter on the sinks and floats generated therein.

If a conventional or other soluble agglomeration promoting additive is employed instead of one of the halogenated hydrocarbon type, the equipment and process steps just described are typically employed except that the additive may optionally be stripped from the product coal agglomerates for subsequent recovery and recycling to agglomerator 10 before the solids are introduced into separator 22 or into conditioner 24.

In particular, in this option, the additive is recovered by transferring the agglomerates to a washer 42 as indicated by line 43. Here, the additive is washed or leached from the agglomerates with a solvent introduced into the washer from storage unit 40 through line 44.

The design of the washer is not critical. It may be, as one example, a countercurrent extractor as shown in U.S. Pat. No. 3,941,679 issued Mar. 2, 1976, to Smith et al.

The solvents we employ are halogenated hydrocarbons of the compositions described above and used as agglomeration promoting additives in those embodiments of our invention employing that type of additive. Those halogenated hydrocarbons with high solvent power and minimal undesirable characteristics such as the listed fluorocarbons are preferred.

Typically, we will employ from 75 to 125 gallons of solvent per ton of agglomerates under ambient conditions to strip the solvent from the product coal agglomerates and to resolve the agglomerates into the particulate product coal and mineral matter making up the agglomerates.

The effluent from the washer consists of product coal and mineral matter wetted with the solvent and a liquid mixture of the solvent-additive that was generated in the washer.

This effluent is transferred through line 45 to a centrifuge 46 which separates the solids from the solvent and additive mixture (the same objective can often be accomplished, at lower cost, by expressing the effluent through steel rolls).

The solids, typically with accompanying burdens of solvent, are transferred from the centrifuge to differential density separator 22 through line (or conveyor) 26 or to conditioner 24 through line 47, the process then proceeding as described above from the selected one of those units.

Generally, it will not be necessary to more completely remove either the solvent or the moisture from the solids prior to effecting the transfer described in the preceding paragraph. The solvent will be either the same liquid as is employed in the conditioner or differential density separator or one compatible therewith, making its removal unnecessary to proper operation of the system or to recovery of the solvent. And, as discussed above, conditioning of the coal with a surface active agent will cause moisture associated with the coal to report to the sinks in the subsequent separation step, making dewatering prior to that step unnecessary.

The solvent-additive mixture isolated in centrifuge 46 or otherwise recovered from the agglomerates if a washing step is employed is transferred through conduit 48 to an evaporator 49 (or distillation column) where the solvent is thermally stripped from the higher boiling point agglomeration promoting additive. The additive is transferred through line 50 to an additive storage facility or tank 52 via which it can be recirculated to agglomerator 10.

Vaporized parting liquid generated in evaporator 49 flows through line 54 to condensor-purge unit 38 where it is combined with vapor flowing to the unit through vapor recovery system 36 and there condensed and purged of non-condensible gases as described above.

In those applications of our invention in which washer 42 is bypassed and the resolution of the agglomerates into their constituents affected in conditioner 24 or density differential separator 22, the agglomeration promoting additive is recovered in solution in the separator. Specifically, solution is withdrawn from the separator, transferred to the distillation column or evaporator 49, and there resolved into its components as just discussed.

The capabilities and advantages of our novel processes as described above are demonstrated by tests in which 60 m × 0raw coal from the Upper Freeport, Pittsburgh, and Lower Kittanning seams were subjected to an agglomeration type beneficiation process and in which the agglomerates were then introduced into a bath of a parting liquid-solvent to resolve the agglomerates into their constituents and to effect a differential density resolution of those constituents.

In each run ca. 100 g of the coal in aqueous slurry (10 percent solids) was agitated with the agglomeration promoting additive in a conventional kitchen blender for two minutes.

The agglomerates were separated from the aqueous, mineral matter phase of the slurry with a 6 in. by 2 in. curved sieve bend and then expressed between two steel rolls, reducing the moisture content of the agglomerates from ca. 40 to less than 10 weight percent.

The "dry" agglomerates were then conditioned as discussed above with OTS (one pound per ton of coal) because of the small size consist of the particles making up the agglomerates and introduced into a body of 1,1,2-trichloro-1,2,2-trifluoroethane to resolve the agglomerates into their constituents and to effect a density differential separation of those constituents. The product coal was recovered and subjected to proximate analysis, that analysis and the density differential separation being carried out essentially in accord with the bench scale protocol described in application Ser. No. 561,168.

Results of the representative tests conducted in accord with the procedure just described appear in the tables which follow. In each case those results are compared with those obtained by employing agglomeration type beneficiation alone. All results are reported on a dry basis.

TABLE 2

Raw Coal: Lower Kittanning
Agglomeration Promoting Additive: Kerosene (50g/100g of coal)

|  |  | Raw Coal | Product Coal | |
|---|---|---|---|---|
|  |  |  | Agglomeration Beneficiation Only | Agglomeration/Density Differential/Beneficiation Process |
| Volatile Matter | % | 29.49 | 35.68 | 36.94 |
| Fixed Carbon | % | 45.64 | 58.58 | 60.23 |
| Ash | % | 24.87 | 5.74 | 2.83 |
| lbs/m BTU |  | 22.56 | 4.01 | 1.92 |
| % Red'n/m BTU |  | — | 82.2 | 91.5 |
| Total Sulfur | % | 0.65 | 0.70 | 0.66 |
| lbs/m BTU |  | 0.59 | 0.48 | 0.44 |
| % Red'n/m BTU |  | — | 18.6 | 25.4 |
| Pyritic Sulfur | % | 0.27 | 0.32 | 0.19 |
| lbs/m BTU |  | 0.25 | 0.22 | 0.13 |
| % Red'n/m BTU |  | — | 12.0 | 48.0 |
| Organic Sulfur | % | 0.35 | 0.37 | 0.45 |
| lbs/m BTU |  | 0.32 | 0.25 | 0.31 |
| % Red'n/m BTU |  | — | — | — |
| BTU/lb |  | 11024 | 14332 | 14719 |
| BTU/lb (MAF) |  | 14673 | 15205 | 15148 |
| Weight Yield | % | — | 74.0 | 83.0 |
| BTU Yield | % | — | 96.2 | 82.0 |
| Specific Gravity |  | — | — | 1.50 |
| ESI |  | 3.5 | 7.0 | 7.0 | m BTU = $10^6$ BTU
MAF = Moisture and Ash Free
FSI = Free Swelling Index, a measure of cokability. Coals with a FSI below 5 cannot be coked.

TABLE 3

Raw Coal: Pittsburgh
Agglomeration Promoting Additive: Kerosene (50g/100g of coal)

|  |  | Raw Coal | Product Coal | |
|---|---|---|---|---|
|  |  |  | Agglomeration Beneficiation Only | Agglomeration/Density Differential Beneficiation Process |
| Volatile Matter | % | 28.64 | 32.24 | 33.52 |
| Fixed Carbon | % | 40.13 | 62.22 | 62.38 |
| Ash | % | 31.23 | 5.54 | 4.10 |
| lbs/m BTU |  | 33.04 | 3.97 | 2.88 |
| % Red'n/m BTU |  | — | 88.0 | 91.3 |
| Total Sulfur | % | 1.71 | 1.44 | 1.21 |
| lbs/m BTU |  | 1.81 | 1.03 | 0.85 |
| % Red'n/m BTU |  | — | 43.1 | 53.0 |
| Pyritic Sulfur | % | 1.27 | 0.71 | 0.48 |
| lbs/m BTU |  | 1.34 | 0.51 | 0.34 |
| % Red'n/m BTU |  | — | 61.9 | 74.6 |
| Organic Sulfur | % | 0.42 | 0.70 | 0.71 |
| lbs/m BTU |  | 0.44 | 0.50 | 0.50 |
| % Red'n/m BTU |  | — | — | — |
| BTU/lb |  | 9,448 | 13,944 | 14,249 |
| BTU/lb (MAF) |  | 13,739 | 14,762 | 14,858 |
| Weight Yield | % | — | 63.9 | 91.8 |
| BTU Yield | % | — | 94.3 | 93.8 |
| Specific Gravity |  | — | — | 1.5 |

TABLE 4

Raw Coal: Upper Freeport
Agglomeration Promoting Additive: 1,1,2-trichoro-1,2,2-trifluoroethane (100g/100g of coal)

|  |  | Raw Coal | Product Coal | |
|---|---|---|---|---|
|  |  |  | Agglomeration Beneficiation Only | Agglomeration/Density Differential Beneficiation Process |
| Ash | % | 20.58 | 8.07 | 5.27 |
| lbs m BTU |  | 17.08 | 5.68 | 3.56 |
| % Red'n/m BTU |  | — | 66.70 | 79.1 |
| Total Sulfur | % | 1.62 | 1.76 | 0.83 |
| lbs/m BTU |  | 1.33 | 1.24 | 0.56 |
| % Red'n/m BTU |  | — | 6.8 | 57.8 |
| Pyritic Sulfur | % | 1.13 | 0.939 | 0.256 |
| lbs/m BTU |  | 0.94 | 0.66 | 0.173 |
| % Red'n/m BTU |  | — | 28.9 | 81.4 |
| Organic Sulfur | % | 0.47 | 0.87 | 0.574 |
| lbs/m BTU |  | 0.39 | 0.57 | 0.388 |
| % Red'n/m BTU |  | — | — | — |
| BTU/lb |  | 12064 | 14204 | 14793 |
| BTU/lb (MAF) |  | 15190 | 15451 | 15616 |
| Weight Yield | % | — | 84.5 | 78.2 |
| BTU Yield | % | — | 94.5 | 95.6 |
| Specific Gravity |  | — | — | 1.50 |

The tabulated data shows that, for widely disparate coals and agglomeration promoting additives, the combination of agglomeration type and density differential separations disclosed herein is capable of producing a superior product coal in terms of reduced ash and sulfur contents.

No attempt was made to directly measure the recovery of the agglomeration promoting additive (kerosene) employed in those tests from which the data tabulated in Tables 2 and 3 was generated. This was unnecessary because kerosene is 100 percent soluble in 1,1,2-trichloro-1,2,2-trifluoroethane and is accordingly recovered from the agglomerates in essentially quantitative amounts when that compound is, as it was, used in the conditioning and density differential separation steps of our process.

Another test designed to demonstrate the advantages of our processes over density differential separation alone was carried out using the agglomeration/density differential separation protocol described above and the bench scale protocol described in application Ser. No. 561,168. The results, again on a dry basis, are reported in the following table:

TABLE 5

Raw Coal: Upper Freeport
Agglomeration Promoting Additive: 1,1,2-trichloro-1,2,2-trifluroethane
(100g/100g of coal)

| | | Raw Coal | Product Coal | | |
|---|---|---|---|---|---|
| | | | Density Differential Separation Only | Agglomeration/Density Differential Beneficiation Process | |
| Size Distribution | | 200 m × 0 | 200 m × 0 | 60 m × 0 | 100 m × 0 |
| Specific Gravity | | 1.50 | 1.50 | — | 1.50 |
| Volatile Matter | % | 24.3 | 27.8 | — | 28.3 |
| Fixed Carbon | % | 52.6 | 64.0 | — | 66.7 |
| Ash | % | 22.86 | 8.2 | 6.63 | 5.21 |
| lbs/m BTU | | 19.37 | 5.7 | 4.55 | 3.56 |
| % Red'n/m BTU | | — | 70.6 | 76.0 | 79.2 |
| Total Sulfur | % | 2.92 | 1.0 | 0.74 | 0.83 |
| lbs/m BTU | | 2.47 | 0.7 | 0.51 | 0.56 |
| % Red'n/m BTU | | — | 71.7 | 44.10 | 97.9 |
| Pyritic Sulfur | % | 2.01 | 0.31 | 0.32 | 0.26 |
| lbs/m BTU | | 1.71 | 0.22 | 0.22 | 0.17 |
| % Red'n/m BTU | | — | 87.3 | 67.6 | 81.9 |
| Organic Sulfur | % | 0.69 | 0.68 | 0.42 | 0.57 |
| lbs/m BTU | | 0.59 | 0.48 | 0.29 | 0.39 |
| Weight Yield | % | — | 60.1 | 66.8 | 78.2 |
| BTU Yield | % | — | 73.4 | 81.4 | 95.6 |
| BTU/lb | | 11,801 | 14,314 | 14,575 | 14,793 |

Again, the advantages in terms of ash and sulfur reduction that can be obtained by utilizing the agglomeration/density differential beneficiation process disclosed herein are clear.

Numerous embodiments of our invention have been described above, and that invention may be embodied in still other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letter Patent of the United States is:

1. A process for recovering coal from a particulate composite in which said coal is associated with mineral matter, said process comprising the steps of: agitating the particles of said composite in a slurry in an aqueous carrier containing an agglomeration promoting additive with respect to which the coal is hydrophobic to effect a separation of the coal particles from the mineral matter, a coalescence of said particles into agglomerates, and the ejection of mineral matter into dispersion in said aqueous carrier; recovering said agglomerates from said aqueous carrier; effecting a resolution of said agglomerates into the particles into which they are composed; and subjecting said particles to density differential separation in a body of parting liquid, whereby those particles which have a relatively high concentration of mineral matter will migrate to the bottom of said body of parting liquid and those particles contain a lower proportion of mineral matter and a high proportion of coal will rise to the top of said body of parting liquid; and thereafter separately recovering the floats and the sinks from said body of parting liquid.

2. A process as defined in claim 1 in which said resolution of agglomerates into particles is effected and said agglomeration promoting additive separated therefrom by contacting said agglomeration promoting additive with a liquid in which said additive is soluble.

3. A process as defined in claim 2 in which the agglomeration promoting additive comprises a petroleum distillate or solvent; a nitrobenzene; a kerosene; a lubricating, fuel, or residual oil; or a chlorinated biphenyl.

4. A process as defined in claim 3 in which, after said product coal agglomerates are contacted with said solvent, the solvent and agglomeration promoting additive solution is mechanically separated from the solids into which the agglomerates are resolved, said solution thereafter being resolved into its constituents and said constituents being recycled.

5. A process as defined in any of the preceding claims 2, 3, or 4 in which said solvent is a halogenated $C_1$ or $C_2$ hydrocarbon which is immiscible with water and which has from two to six halogen atoms.

6. A process as defined in claim 1 in which the resolution of said agglomerates into particles and the recovery of the agglomeration promoting additive therefrom is carried out in said body of parting liquid.

7. A process as defined in claim 1 in which the resolution of said agglomerates into particles and the recovery of the agglomeration promoting additive therefrom is carried out prior to the density differential separation of said particles.

8. A process as defined in claim 1 in which said parting liquid is a halogenated hydrocarbon that is immiscible with water and has a specific gravity in the range of 1.2 to 2.2 and from two to six halogen atoms.

9. A process as defined in claim 1 in which said composite is comminuted while in said aqueous carrier to promote the separation of the coal from the mineral matter associated therewith and the coalescence of said coal into product coal agglomerates.

10. A process as defined in claim 1 in which calcium oxide is added to said slurry concomitantly with the agglomeration of the coal particles thereof to promote the rejection of pyritic sulfur from the product coal agglomerates into dispersion in said aqueous carrier.

11. A process as defined in claim 1 which includes the step of, prior to effecting said density differential separation, contacting said agglomerates with a solvent in which said agglomeration promoting additive is soluble to thereby effect a separation of said additive from said agglomerates and make it available for reuse in the process.

12. A process as defined in claim 1 in which the agglomeration promoting additive comprises at least one fluorocarbon selected from the group consisting of:
dichlorofluoromethane
trichlorofluoromethane
1,1,2,2-tetrachloro-1,2-difluoroethane
1,1,2-trichloro-1,2,2-trifluoroethane
1,1-dichloro-1,2,2,2-tetrafluoroethane
1-chloro-2,2,2-trifluoroethane
1,1-dichloro-2,2,2-trifluoroethane
1-chloro-2-fluoroethane
and mixtures of the foregoing.

13. A process for recovering coal from a particulate composite in which said coal is associated with mineral matter, said process comprising the steps of: agitating the particles of said composite in slurry in an aqueous carrier containing an agglomeration promoting additive with respect to which the coal is hydrophobic to effect a separation of the coal particles from the mineral matter, a coalescence of said particles into agglomerates, and the ejection of mineral matter into dispersion in said aqueous carrier; recovering said agglomerates from said aqueous carrier; agitating said agglomerates in slurry with a surface active agent and with a halogenated $C_1$ or $C_2$ hydrocarbon in amounts and for a time sufficient to effect a resolution of said agglomerates into the particles into which they are composed, a transfer of moisture to those particles having a relatively high mineral matter content, an agglomeration of those particles, and the envelopment of those particles having a lower mineral matter content and a relatively high coal content with the surface active agent; and subsequently subjecting said particles to density differential separation in a body of a parting liquid comprising a halogenated $C_1$ or $C_2$ hydrocarbon having a specific gravity intermediate those of the particles having a relatively high coal content and the agglomerates of particles with a relatively high mineral content, whereby said agglomerates will sink to the bottom of said body of parting liquid and those particles which contain a lower proportion of mineral matter and a high proportion of coal will disperse in and migrate to the top of said body of parting liquid; and thereafter separately recovering the floats and the sinks from said body of parting liquid.

14. A process as defined in claim 13 which includes the steps of removing agglomeration promoting additive/parting liquid solution formed in effecting the resolution of those agglomerates containing said additive from the separator in which the density differential separation is carried out; resolving the solution into its constituents; and recycling said constituents.

15. A process for recovering coal from a particulate composite in which said coal is associated with mineral matter, said process comprising the steps of: agitating the particles of said composite in slurry in an aqueous carrier containing an agglomeration promoting additive with respect to which the coal is hydrophobic to effect a separation of the coal particles from the mineral matter, a coalescence of said particles into agglomerates, and the ejection of mineral matter into dispersion in said aqueous carrier; recovering said agglomerates from said aqueous carrier; effecting a resolution of said agglomerates into the particles of which they are composed; agitating said particles in slurry with a surface active agent and with a halogenated $C_1$ or $C_2$ hydrocarbon in amounts and for a time sufficient to effect a transfer of moisture to those particles having a relatively high mineral matter content, an agglomeration of those particles, and the envelopment of those particles having a lower mineral matter content and a relatively high coal content with the surface active agent; and subsequently subjecting said particles to density differential separation in a body of a parting liquid comprising a halogenated $C_1$ or $C_2$ hydrocarbon having a specific gravity intermediate those of the particles having a relatively high coal content and the agglomerates of particles with a relatively high mineral matter content, whereby said agglomerates will sink to the bottom of said body of parting liquid and those particles which contain a lower proportion of mineral matter and a high proportion of coal will disperse in and migrate to the top of said body of parting liquid; and thereafter separately recovering the floats and the sinks from said body of parting liquid.

16. A process for recovering coal from a particulate composite in which said coal is associated with mineral matter, said process comprising the steps of: agitating the particles of said composite in slurry in an aqueous carrier containing an agglomeration promoting additive with respect to which the coal is hydrophobic to effect a separation of the coal particles from the mineral matter, a coalescence of said particles into agglomerates, and the ejection of mineral matter into dispersion in said aqueous carrier; recovering said agglomerates from said aqueous carrier; subjecting said agglomerates to density differential separation in a body of a parting liquid capable of effecting a resolution of said agglomerates into sinks of which have a relatively high concentration of mineral matter and therefore migrate to the bottom of said body of parting liquid and into floats which contain a lower proportion of mineral matter than said sinks and a high proportion of coal and therefore rise to the top of said body of parting liquid; and thereafter separately recovering said floats and said sinks from said body of parting liquid.

17. A process as defined in claim 16 which includes the steps of removing agglomeration promoting additive/parting liquid solution formed in effecting the resolution of the agglomerates from the separator in which the density differential separation is carried out; resolving the solution into its constituents; and recycling said constituents.

18. A process for dissociating coal from a composite in which mineral matter is associated therewith and recovering said coal in agglomerated form, said process comprising the steps of: forming a slurry of said composite in an aqueous carrier with respect to which said mineral matter is hydrophilic; providing in said slurry an agglomeration promoting additive with respect to which said coal particles are hydrophobic in an amount sufficient that agglomeration of the coal can be effected; comminuting the composite while in said slurry to separate mineral matter from the coal and to generate coal particles having freshly exposed surfaces in a controlled environment; mechanically effecting the coalescence of the coal particles into agglomerates and the ejection of mineral matter and water from the agglomerates into dispersion in said aqueous carrier; recovering said agglomerates from said slurry; effecting a resolution of said agglomerates into the particles into which they are composed; and subjecting said particles to density differential separation in a body of a parting liquid, whereby those particles which have a relatively high concentration of mineral matter will migrate to the bottom of said body of parting liquid and those particles which contain a lower proportion of mineral matter and a high proportion of coal will rise to the top of said body of parting liquid; and thereafter separately recovering the floats and the sinks from said body of parting liquid.

* * * * *